(12) United States Patent
Jenkins et al.

(10) Patent No.: US 7,065,381 B2
(45) Date of Patent: *Jun. 20, 2006

(54) PERSONAL COMMUNICATOR

(75) Inventors: Michael D. Jenkins, Burke, VA (US); John F. Moynahan, Fairfax, VA (US)

(73) Assignee: Xybernaut Corporation, Chantilly, VA (US)

( * ) Notice: Subject to any disclaimer, the term of this patent is extended or adjusted under 35 U.S.C. 154(b) by 602 days.

This patent is subject to a terminal disclaimer.

(21) Appl. No.: 09/858,082

(22) Filed: May 15, 2001

(65) Prior Publication Data

US 2001/0036840 A1      Nov. 1, 2001

Related U.S. Application Data

(63) Continuation-in-part of application No. 09/443,024, filed on Nov. 18, 1999.

(51) Int. Cl.
*H04B 1/38* (2006.01)

(52) U.S. Cl. ............... 455/556.1; 455/556.2; 455/575.1; 455/349

(58) Field of Classification Search ............ 455/552.1, 455/556.1, 556.2, 557, 572, 573, 575.1, 575.3
See application file for complete search history.

(56) References Cited

U.S. PATENT DOCUMENTS

| 5,768,100 | A | * | 6/1998 | Barrus et al. | 361/686 |
| 5,999,952 | A | * | 12/1999 | Jenkins et al. | 708/100 |
| 6,029,183 | A | * | 2/2000 | Jenkins et al. | 708/100 |
| 6,085,112 | A | * | 7/2000 | Kleinschmidt et al. | 455/556.1 |
| 6,091,965 | A | * | 7/2000 | Voroba et al. | 455/570 |
| 6,134,453 | A | * | 10/2000 | Sainton et al. | 455/553.1 |
| 6,360,104 | B1 | * | 3/2002 | Budd et al. | 455/566 |
| 6,757,551 | B1 | * | 6/2004 | Newman et al. | 455/556.1 |

\* cited by examiner

*Primary Examiner*—Temica Beamer
(74) *Attorney, Agent, or Firm*—Christopher M. Tucker (57) ABSTRACT

This invention provides a single unit called a personal communicator that combines the functions of a cell phone (or mobile phone), a body-supported computer and a pager. The personal communicator has three detachable modules: a communications module; a display module; and a core computer module. The core computer module has all of the components of a general purpose computer. Each of the modules when detached can be used in other systems such as with larger display screens.

14 Claims, 7 Drawing Sheets

PERSONAL COMMUNICATOR

This application is a Continuation in Part application of parent application Ser. No. 09/443,024 filed Nov. 18, 1999.

This invention relates to a portable communication means and more specifically to a novel communicator comprising phone functionality, pager functionality and computer functionality.

BACKGROUND OF THE INVENTION

It is known to use a hand-carried cellular or other type of phone or wireless communicators or radio communication. It is also known to use a portable pager with means for multiple pager messages and a pager display. Typical cellular phones and pagers are described in U.S. Pat. Nos. 5,884,188; 5,933,088; and 5,940,742. Also wearable hands-free computers are known, the most popular being Xybernaut Corporation's Mobile Assistant. This hands-free computer is described in U.S. Pat. No. 5,305,244 (Newman I) and U.S. Pat. No. 5,844,824 (Newman II), both owned by Xybernaut Corporation. Since phones, pagers and computers have been extensively used, it has become awkward to have to carry each on the person. In addition, wearable computers will be the next generation computer, and it is not a stretch of the imagination to consider that soon every business person will carry one around all day.

In U.S. Pat. No. 5,844,824 (Newman II) there is a clear disclosure of the use of cellular or radio or handwire telephone communication means used with a mobile computer, Claim 6 of Newman II clearly defines this concept. The disclosure of Newman II on specifics of such a combination is incorporated by reference into this disclosure. Also Xybernaut Corporation has several co-pending patent applications Ser. Nos. 08/911,642; 09/009,206 and 09/294,668 which disclose respectively transferable core computer systems, core computer units, and modular wearable computers; each of these applications disclose concepts relevant to the present invention. In Ser. Nos. 08/911,642 and 09/009,206 a mobile core unit is disclosed which has all of the components of a general purpose computer (except for a display). This core unit by itself is non-functional as a computer unless it is in electrical contact with an enclosure, which also supplies functionality. The enclosure has several connector ports for attachment of peripherals to the system. Ser. No. 09/294,668 discloses the concept of computer-containing modules each assembled together to form a conventional computer, except that the computer is body worn and has heat-controlling aspects.

While each of the above patents disclose mobile phones, two-way radios, pagers and computers, the disadvantage is that none of these patents suggest the use of a single easily carried mobile structure which is modular and can provide a telephone function, a computer function, e-mail, personal organizer, facsimile and a pager function.

The prior art problem is that there is no one device that can perform or handle multiple inputs from different sources (e.g. pager, communication device, personal e-mail device, core computer, personal organizer) and, because of that, a user must carry around multiple devices. Prior art small computers in phones do not have the capacity and memory to be affective as a general purpose computer while worn or if removed and used with other higher requirement enclosures. Computer can store a multitude of information without going through a central phone location. Additionally, if a sending party only has the capability to send information in one format (e.g. paper/electronic fax, phone, etc.) and the receiving party does not have the ability to accept (receive) a paper fax, pager, or if the receiving party currently cannot receive electronic faxes because he only has a cell phone or if his laptop is in the backseat of his car and he is driving down the freeway, the receiving party must wait until it is safe to download the fax from a staging area using his or her laptop and cell phone or, in the case of highly sensitive information, the sending party would need to wait before sending the fax until the receiving party can guaranty the safe delivery of the fax.

Currently, when a third party needs to notify or transmit information to another person, this transmission depends on the type of information that needs to be conveyed and the capability of the receiving person to receive this information. The ability of the receiving party to receive this transmission is limited to the device he or she is carrying, i.e. pager or phone, etc. That is, the ability today to communicate information to a given person is limited by not only what capability the receiving person has access to or in their possession but also what the sending party has access to or is in his or her possession. For example, if a person needs to show the receiving party an important fax, the receiving person will most likely need a device that can receive and display that information. This is possible when the receiving party has that capability (usually a cell phone connected to a computer) or when a fax machine is located nearby (in hotel room, office or some other physical location). But what happens when that information needs to be conveyed and all the user has in his or her possession is a pager or a cell phone? The important fax is either read over the cell phone to the intended receiving party or is faxed to a remote location whereby the receiving party can pick it up or the fax is sent to a staging area (typically e-mail or stored on the Internet for later downloading).

SUMMARY OF THE INVENTION

It is therefore an object of this invention to provide a mobile structure devoid of the above-noted disadvantages.

Another object of this invention is to provide one structure that can function as a computer, wireless phone and pager.

Yet another object of this invention is to provide a modular structure that can be disassembled into a computer, pager and cellular phone when desired.

Still a further object of this invention is to provide a personal communicator unit containing a core module that can be broken out and attached to a larger display or monitor.

Yet, still a further object of this invention is to provide a personal communication means that integrates technology of wearable computers, cellular phones, and pagers, each attached to each other in a modular configuration.

Still another object of this invention is to provide a personal communication means with a core computer module that has means for connection to a high resolution FPD for shared viewing.

These and other objects of this invention are accomplished generally speaking by a personal communicator in modular form containing at least three modules that allows the removal of a communication (phone) module, a removable core computer module, and a removable pager module. While its preferred that the three modules be removable it is not necessary, the modules can be in a unitized structure not removable one from the other. The term "personal communicator" means throughout this disclosure as the unit with all three modules, i.e. 1. communication module; 2. display module; 3. core computer module or core module. In some embodiments the pager and core computer module can be included in one and the same module. The battery is located in any suitable module(s). The core computer module is identical to that described in U.S. Pat. Nos. 5,999,952 and 6,029,183. The core unit of this invention is simple, uncomplicated and is carried in a single closed housing, only to be easily removed or inserted as a unit into a mating enclosure such as the personal communicator of this invention. The core unit of this invention has preferably only one uniquely configured connecting means which mates with or fits against a power connector source or activating means in an enclosure such as the personal communicator of this invention. Other than this connecting means, all of the components of the core unit are sealed and not removable from the core housing. This same connecting means also provides communication or transfer of information over a bus or in a wireless fashion. In the core unit all of the computer components stay intact unlike the prior art where, for example, the CPU is removed and replaced with a second CPU or other components. The security offered by the core unit is provided by uniquely structured mating connection means which connect to a mate connector in the enclosure. In the event that the core unit is lost or misplaced, its data cannot be used, read or printed out by others because it can only be activated by connection to an equally unique mating connector in the enclosure. Also, for security reasons, the core unit is in a completely closed housing so that no computer component may be removed, copied or tampered with. This feature is critical to this invention.

By "enclosure", "enclosed" or "enclosing" is meant throughout this disclosure and claims the personal communicator of this invention; also that the core unit is connected or at least partially housed by the enclosure. By the term "communication activation means" is meant wireless transmission or communication, radio, cellular communication and the like.

The core unit of the present invention is entirely different than the computer devices of the prior art; in particular, the cartridge unit of U.S. Pat. No. 5,608,608 and U.S. Pat. No. 6,085,112 (Kleinschmidt). U.S. Pat. No. 5,608,608 (Flint) discloses the use of two chassis and a cartridge having separate functional components that interface with one another over a common bus.

The core unit of this invention is small, compact and self-contained. Each of the enclosures that the core unit can be inserted into can have its own set of distinct peripheral devices or peripheral connector ports for performing singular or multiple functions; for example, if a technician in a factory has the responsibility to perform inventory control, the core unit would be inserted into an enclosure that has connector ports that are specific to perform the inventory functions (e.g. port for a bar code scanner and communications to a remote computer). If the same technician has the responsibility to repair and maintain equipment in that facility, the technician could remove the core unit from the inventory enclosure, insert the same core computer into a different enclosure that has, again, distinct peripheral devices or connector ports specific to performing maintenance functions (e.g. 1553 interface for performing non-intrusive testing of equipment, head mounted display port, and a digital multi-meter for taking electrical readings) and therefore function as a repair and maintenance computer. Additional security means can be inserted into the technician's core unit if security becomes important in use to allow only him or her access to enclosures or systems.

The same technician might also have an office and need access to, and operate from, a laptop computer. The core computer used in the above examples could also be inserted into a laptop enclosure where all peripheral connector ports, embedded peripheral devices (e.g. CD-ROM reader), and a means for providing power are in an enclosure that looks like a laptop. When the core unit is inserted into the laptop enclosure the unit would function as a traditional laptop.

In Kleinschmidt U.S. Pat. No. 6,085,112, a communication device is disclosed having a removable module MOD where "in the removed state, the module MOD maintains the connection to the basic unit via a transmission link U.S. communication means KM1 and KM2 etc." Also, Kleinschmidt indicates that the module MOD computer is operable as a computer even when removed from the communication device i.e. column 3 lines 24–27 "has a memory in which data can be stored so that satisfactory operation is made possible with the device even off-line". In other words, Kleinschmidt's computer or module MOD is functional as a computer even when removed from the communication device. This is completely different from the present claimed core module which will not function as a computer when detached from the enclosure. Also, only the enclosure supplies battery or other power to the core module of this invention, the core module itself has no battery or other power. This is in contract to Kleinschmidt where the MOD has its own battery, see column 5 lines 21–25. This battery is Kleinschmidt is necessary because his MOD operates when detached while the present disclosed invention's core module cannot operate as a computer when detached from its enclosure.

The components for the universal core unit of this invention can be similar to those disclosed in U.S. Pat. No. 5,305,244 which is incorporated by reference into this disclosure. The CPU, for example, can be an 80286, 80386SX, 80486 or Pentium microprocessor available from Intel. The enclosures will include different interfaces and controllers for use with other types of peripherals such as Cardbus, other communication devices, or the like. Circuit cards such as those obtained from Dover Electronics Manufacturing of Longmont, Colo. and Ampro Computers of Sunnyvale, Calif. can be used in the core unit, if desired. If the core unit is voice activated, it could contain a voice-recognition engine available from Dragon Systems, Newton, Mass. used in connection with a sound card. Other components used in the core unit of this invention are off the shelf-presently available components such as those disclosed in U.S. Pat. No. 5,305,244 and U.S. patent application Ser. No. 08/538,194 and its continuation application filed May 22, 1997. The core unit is different in that it cannot operate as a computer until inserted into a special enclosure which will only accept core units with a unique connector means, thus a very secure system may be provided.

The transferable and removable standardized core computer unit of this invention includes a single housing comprising therein standard features of a self-contained general purpose computer. The enclosure unit has at least one electrical connector means for connection to a bus connection and to a source of power outside the enclosure. It will only work off the source of power provided by or through an enclosure and will not function as a stand-alone unit if directly attached to a power source. The enclosure comprises peripheral connector ports or devices to cooperate with said core computer unit when said core unit is placed therein, and the core computer unit has means to cooperate with a plurality of different enclosures when inserted into said enclosures in either an original placement or transferred from another enclosure. The core computer unit has activation cooperation means for interaction with the desired activation means. The activation means are selected from the group consisting of audio activation means, brain activation means, eye-tracking activation means, mouse activation means, a keyboard activation means and mixtures thereof. The core unit has no removable components and will not function as a computer without said enclosure.

Any suitable portable phone, including a cellular phone as known in the art and described in U.S. Pat. Nos. 5,884,188 and 5,870,678 may be used as the "communication means". Also any known or suitable pager module may be used such as the pager disclosed in U.S. Pat. Nos. 5,933,088 and 5,940,742. Any suitable e-mail known means may be incorporated in the structure of this invention. The personal communicator of this invention provides a small but effective display and an antennae, all of which will be defined later in relationship to the accompanying drawings. In addition, while the three module "personal communicator" i.e. communication module, display module and core computer module is highly preferred, other devices such as a camera, still and/or video and/or television and/or a radio may be incorporated into the display module (or other modules). The display in the display module can act as the video display or television screen if this embodiment is used. Any known type radio, television or camera can be used in the present invention, such as those already on the market. The central part of the communicator system of this invention is a computer therefore it can be adapted for use in any communication system, i.e. pager, phone, e-mail, facsimile, etc. When a user is located at his or her desk, the ability to send information (regardless of format) is simple. Desktop PCs can receive faxes, send and receive e-mail, download and view/use/manipulate data files, make phone calls (voice over IP), surf the web and perform other generic computer functions. To best mimic his or her desktop environment when leaving the office, it would be necessary to take along a cell phone, pager, personal organizer and laptop computer functions and, even though some of the capabilities of these devices overlap, they provide convenience to the user. They overlap primarily because, in some situations, the user, because of some function he or she is performing, is incapable of using certain devices. The present invention provides a convenient mobile, personal communicator capable of transmitting or receiving information via all of said functions. Whereas the designs based on prior art whenever they integrate communication capabilities typically have enough hardware resource to communicate with a single service provider, the present invention because of the core module for designs which have enough flexibility and resources to allow them to be used with many and different service providers on a call by call basis or in some multichannel implementations on a packet by packet basis. This allows the user to leverage the purchased personal communicator to use it with one or many service providers and change between them at will and not be locked into a single provider.

The computer core module, when detached, has hands-free activation, such as audio activation, eye-tracking activation means, electroencephalography activation means, head and arm activation means and mixtures thereof. All of these hands-free activation means are disclosed and described in detail in U.S. Pat. No. 5,844,824 which, as above noted, is incorporated by reference into this disclosure. The computer core may be body supported or attached to another enclosure as disclosed in Ser. No. 08/911,162. It is critical to this invention that the computer module not be operable as a computer when detached, be composed of a general purpose computer and be removable or not removable and have means to be used with other enclosures or systems other than the personal communicator of this invention. The present invention provides a communicator that can utilize any of the communication systems popular today, i.e. cell phone, pager, e-mail, computer, personal organizer and facsimile. Thus, a transmitter with only a pager can reach his or her party as will a transmitter with only a facsimile or phone reach this same party. The invention described herewith not only avoids the necessity for someone to carry multiple devices but also allows total range of the communication means to be transmitted or received.

The present structure includes a compact, self-contained portable computing module which is completely supported by a user for hands-free retrieval and display of information for the user. The computing apparatus includes a housing which may or may not have securing means for removably securing the housing to a user for support by the user. The housing may further include storage means for storing previously entered information, and processor means, communicating with the storage means, for receiving, retrieving and processing information and user commands in accordance with a stored program including e-mail capabilities. Since large databases of ETMs and IETMs will be accessed by the mobile self-contained computing apparatus, a means of easily interfacing storage means containing the databases is required. The housing of the computing apparatus includes an access port whereby various storage means containing data can be interfaced and communication established. Access and transfer of data between the storage means and the computing apparatus can be accomplished entirely under control of various hands-free activation means described in this application. The access port allows direct electrical attachment of the storage means; however, other wired and wireless connections are also used. When the computing module is removed and used by itself activation means that can be used include the above-described eye-tracking, brain-actuation means, head and arm-tracking means and mixtures thereof. The computing apparatus, in addition to all of the conventional computer components, further includes display means in communication with the processor means for receiving information from the processor means and for displaying the received information for the user, the display means being supported by the user whereby the user may operate the computing apparatus to display information in a hands-free manner utilizing only brain activation or eye tracking with or without audio commands.

As above noted, specifics of eye tracking and brain-actuated control (electroencephalography) and head and arm-tracking means are disclosed in detail in U.S. Pat. No. 5,844,824 which is incorporated by reference into this disclosure.

A further feature of an embodiment of the present invention utilizes an adapter used in each mobile computer module to permit the use therein of cellular or hardwire telephone communication. In place of the cellular telephone communication means, a radio frequency, infrared, laser or fiberoptic transceiver or other communication means may be used. These will generally be referred to in this disclosure as "communication means".

The computer apparatus module of this invention may be interfaced with a telephone system in such a way as to provide hands-free telephone communication between multiple persons and/or computers. One or more of these may be performing telephone communications by using the present computer apparatus. As earlier noted, communications may include, but are not limited to, voice, data, including interrogation and control of built-in test codes, video images and sounds. Operation may be hands-free using the voice-activated feature of the present computer apparatus, manually-activated using a keypad or a combination of both.

Telephone systems that may be interfaced include but are not limited to: RJ-11 wall jacks commonly found in homes and small businesses, multiple line telephone switching systems found in medium and large businesses, cellular communications, radio frequency communications interfaces and cordless accessories to any of the above.

The basic system incorporates the apparatus of this invention, i.e. hands-free body-worn computer with voice activation and a head-mounted or other user-supported display, a telephone system and a unique electronic interface between the two that integrates both traditional analog voice signals and computer data between the two components.

Integration of private, as well as public telephone communications into this system may be accomplished using a voice/data modem (modular/demodular) as now used with existing computing systems. The modem is either built into the host computer or it can be inserted as a "PCMCIA" or "PC Card" into the host computer. In addition, communication means in the headset can also utilize built-in modem to interface through communications means to a remote device. Using the communication means of the system, data and voice can be transmitted and received between headsets and mobile systems, as well as between mobile systems.

In an embodiment of this invention a product is provided containing two different sets of I/O's and two different form factors but using the same computer fundamental computer functionality and/or subassembly simply by swapping the computer functionality (may or may not contain additional functionality) between the two different sets. It is envisioned that the smaller set or structure will be a personal communicator containing the functionality of a wearable or hand-held computer, as well as telephony and other communications functionality. It is envisioned that at least one of the designs would include one of the sets or structures that contains a small FPD or other type of display that would fit in a jacket or shirt pocket, a set or structure that contains a large paper size (8.5"×11") or laptop size higher resolution FPD or other type of display and a common module containing the computer functionality as well as pager functionality. The large, high-resolution flat panel display set or structure solves a fundamental problem which arises with the small form factor computers that have screens too small for shared viewing by multiple people.

The design of this invention integrates wearable computer functionality, cellular phone, personal e-mail means, personal organizer functionality and pager functionality into a single wearable or handheld personal communicator. The personal communicator is designed in a modular fashion in such a way as to enable the breakaway of modules containing one or more functions. The modules may be subsequently used in conjunction with a larger FPD or any other type of display. Of particular interest is a module containing the core functionality of a wearable PC and the functionality of a pager. Such a module can be broken out of the personal communicator and attached to a larger flat panel display as an accessory to constitute laptop functionality which may be packaged in a folio type packaging and designed to stand on a flat surface in an inverted V configuration for shared viewing.

All of the drawings and description of the drawings will be referred to using the audio activation means only of this invention; however, keyboard and pen activation may be used in the pager component while only audio activation may be used in the phone or communication module (cellular phone etc.) and the entire "personal communicator". A keyboard or touch screen may be used on the phone module, by itself or in combination with voice activation. The touch screen may also be used as the display means.

DETAILED DESCRIPTION OF THE DRAWINGS AND PREFERRED EMBODIMENTS

Figure 1:
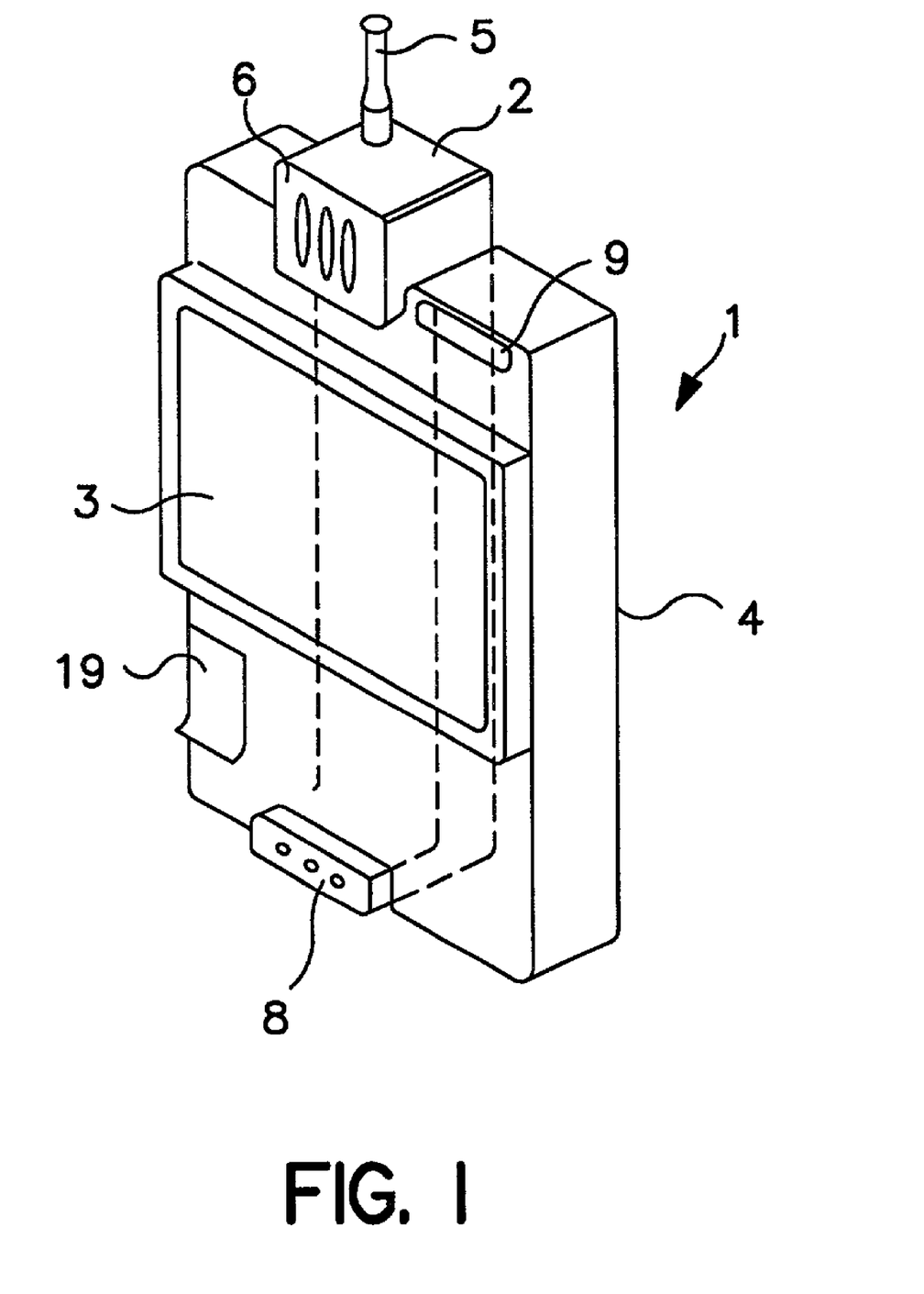
FIG. 1 is a back perspective view of the personal communicator of this invention with the communications and core computer module shown connected together.
Figure 2:
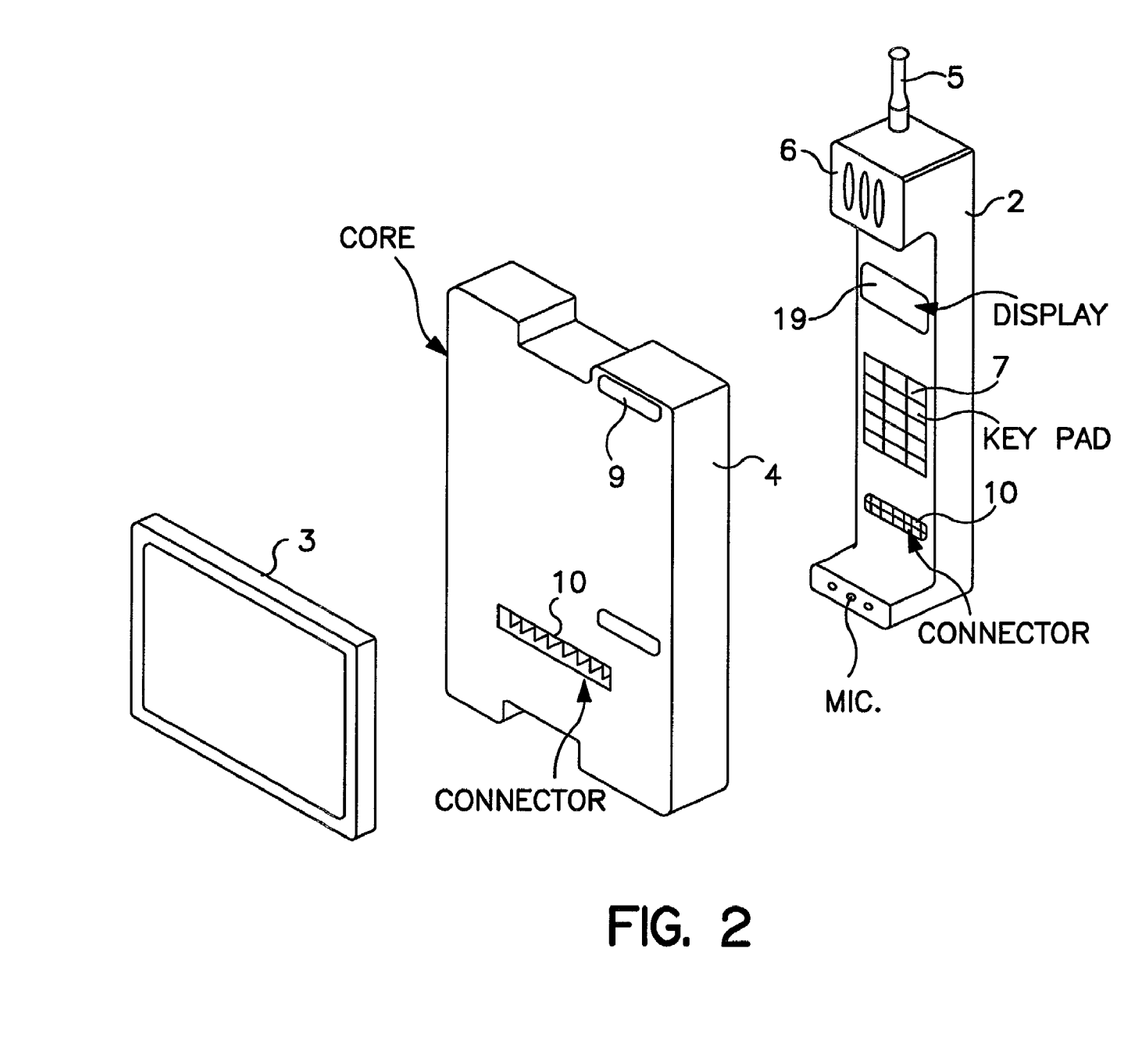
FIG. 2 is a front perspective view of one embodiment of the personal communicator of this invention with the modular components detached from each other.
Figures 7A, 7B:
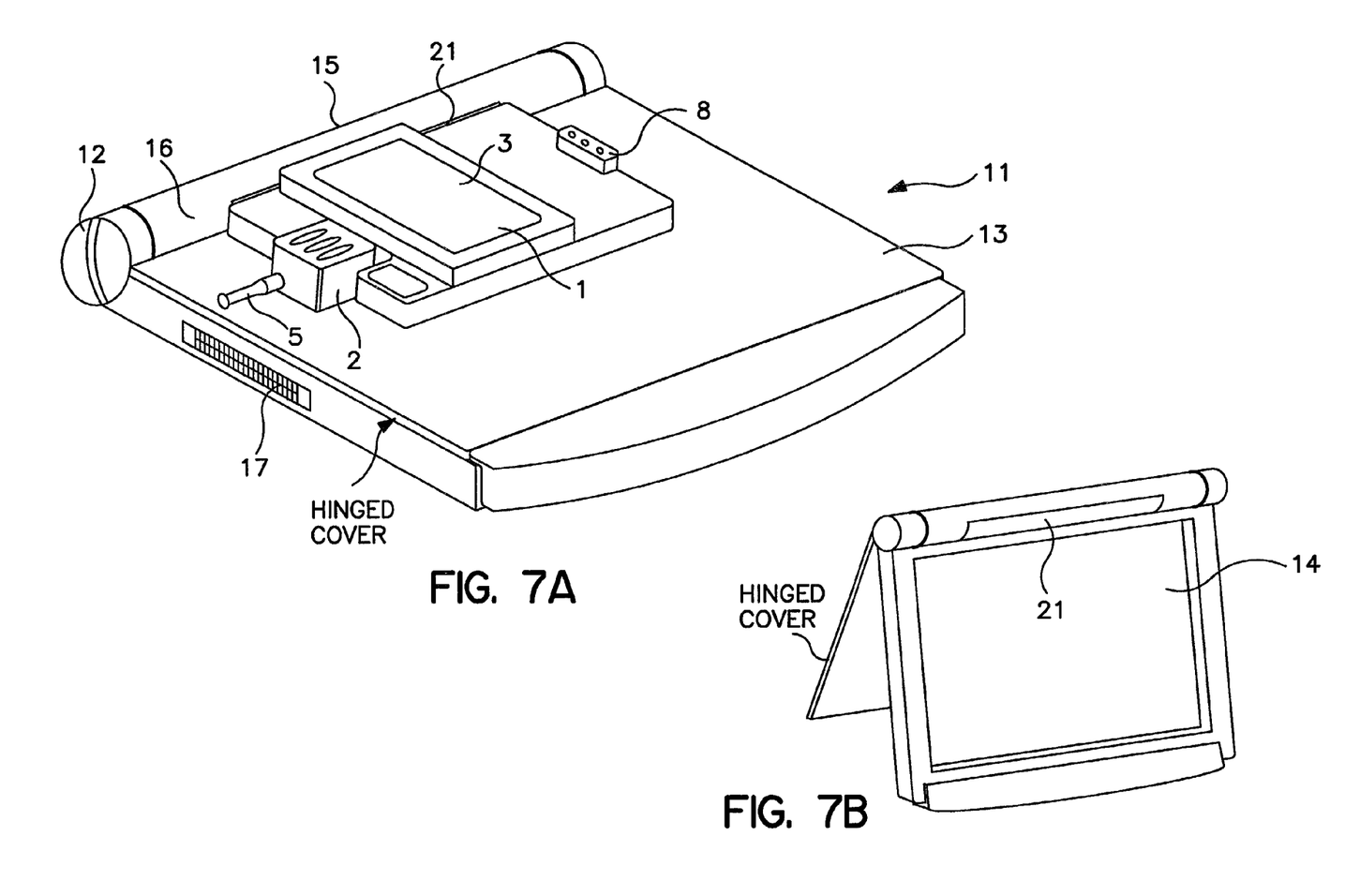
FIG. 7A is a perspective top view which shows a closed folio with a larger screen and with the unit 1 docked therein or thereon.
FIG. 7B is a perspective front view of a folio in an open mode without the unit 1 docked therein.

In FIGS. 1 and 2 a first embodiment, the hand-held personal communicator 1 of this invention, is illustrated having three removable modules, a communications module 2, a display module 3 and a core computer module 4. The core computer module 4 in one embodiment of this invention contains also a pager with a small display 9. The personal communicator 1 integrates wearable computer functionality with cellular phone and pager functionality, only one small unit 1 needs to be worn rather than three separate cumbersome units. The computer module 4 is designed so that it can subsequently be used in conjunction with a larger flat panel display or any other structure as would a general computer. A unique feature in this invention is that each module 2, 3, or 4 can be subsequently used in other systems. Also, an accessory such as a member selected from the group consisting of radio, television, video camera, still camera, or mixtures thereof may be used in or integral with at least one of modules 2, 3, or 4. The personal communicator or the core computer module 4 in a preferred embodiment has means 20 for a connection to a user, such as around his or her waist, torso or wrist. Connecting means 20 can be either or both on the front or back of unit 1. The core computer module 4 can be broken away from the personal communicator 1 and attached or connected to a larger flat panel display (FPD) to constitute laptop functionality. The FPD may be a folio type design having means to stand on a flat surface in an inverted V configuration for shared viewing as illustrated in FIGS. 7A and 7B. The unit 1 in FIG. 1 has an antenna 5, as does a conventional cell phone (or other communication means). This same (or an additional antenna 5) may be used when a radio or television is used in the system. The radio, television or camera accessories are not specifically shown in the drawings since they would be illustrated as internal and integral with and would not change the appearance of modules 2, 3, or 4. For example, the display module 3 could also be the television screen and the touch board or screen 7 could be the channel or radio station selector. The volume on both can be controlled by any suitable known means. In the communications module 2 is positioned an ear piece 6 and a microphone 8 into which the user will speak when unit 1 is used as a mobile or cellular phone. A touch screen 7 is positioned between the communications module 2 and core module 4; the touch screen 7 has a dual use; it is used to touch the phone number being called and it can be used as the display for the personal communicator 1 and/or the core computer module 4. By "core computer" module is meant throughout this disclosure a computer preferably having the following parameters—a) not operable as a computer when detached from the enclosure; b) being usable with other enclosures besides the personal communicator of this invention; c) have no power means; and d) having all computer components completely enclosed in a sealed housing so that the components cannot be removed, replaced or tampered with. It is critical to the present invention that the computer has these features in order to function in all of the modes intended and to be useful as a general purpose computer.

By "display module" is meant throughout this disclosure a display preferably having at least full VGA resolution of 640×480.

Figure 3:
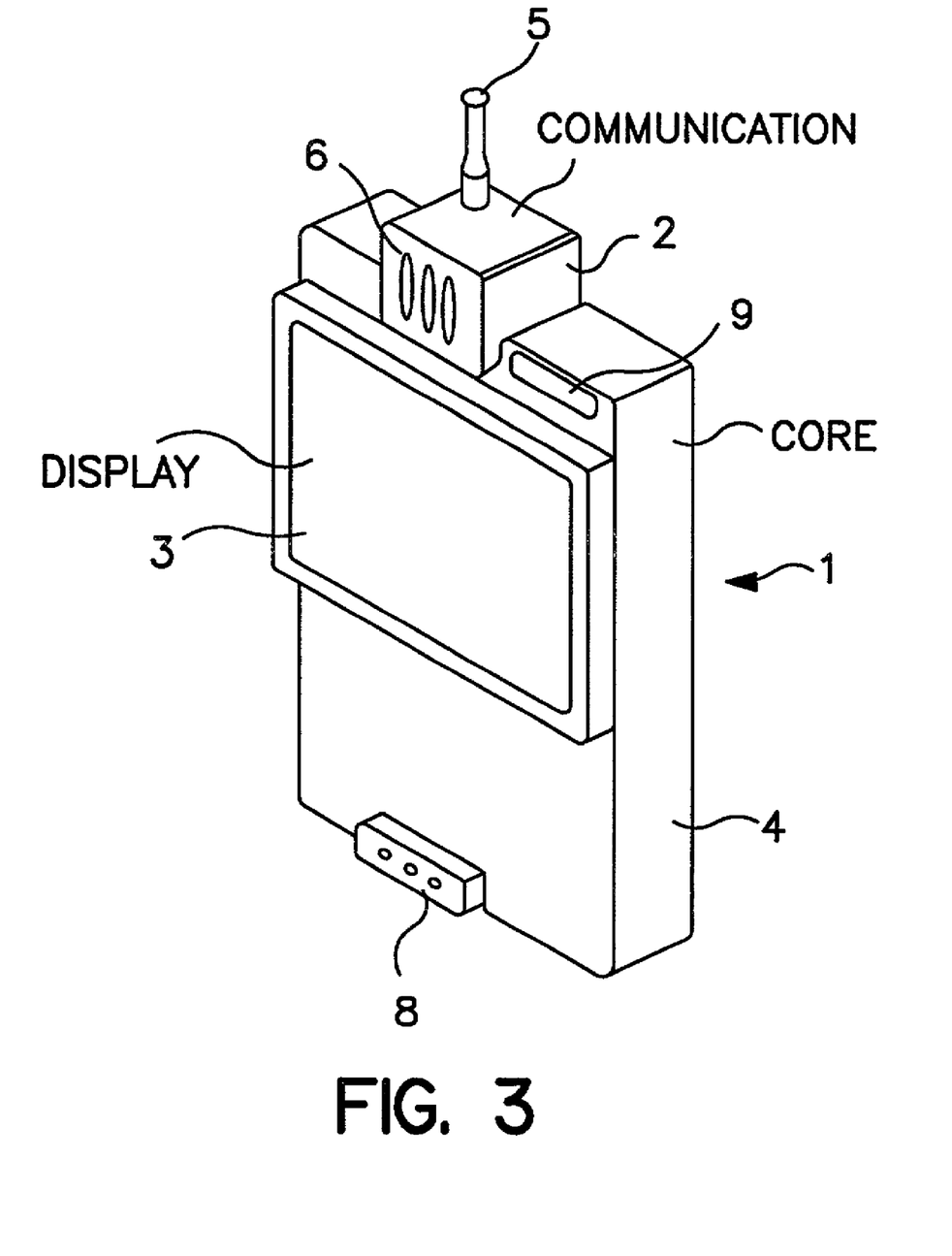
FIG. 3 is a front perspective view of an embodiment of the personal communicator of this invention with the three modules all attached to each other.

In FIG. 3, an embodiment of the personal computer 1 is shown where each module is attached. In this embodiment communications module 2 with touch screen 7 is attached to core module 4 and display module 3. Core computer module 4 in this embodiment may contain the pager and pager screen 9. The display module 3 in this illustrated FIG. 3 may contain if desirable any known television, radio, video or still camera with the conventional structures known in the art. Also display module 3 has means to accept text (or other information) being transmitted to the unit 1 via facsimile.

Figure 4:
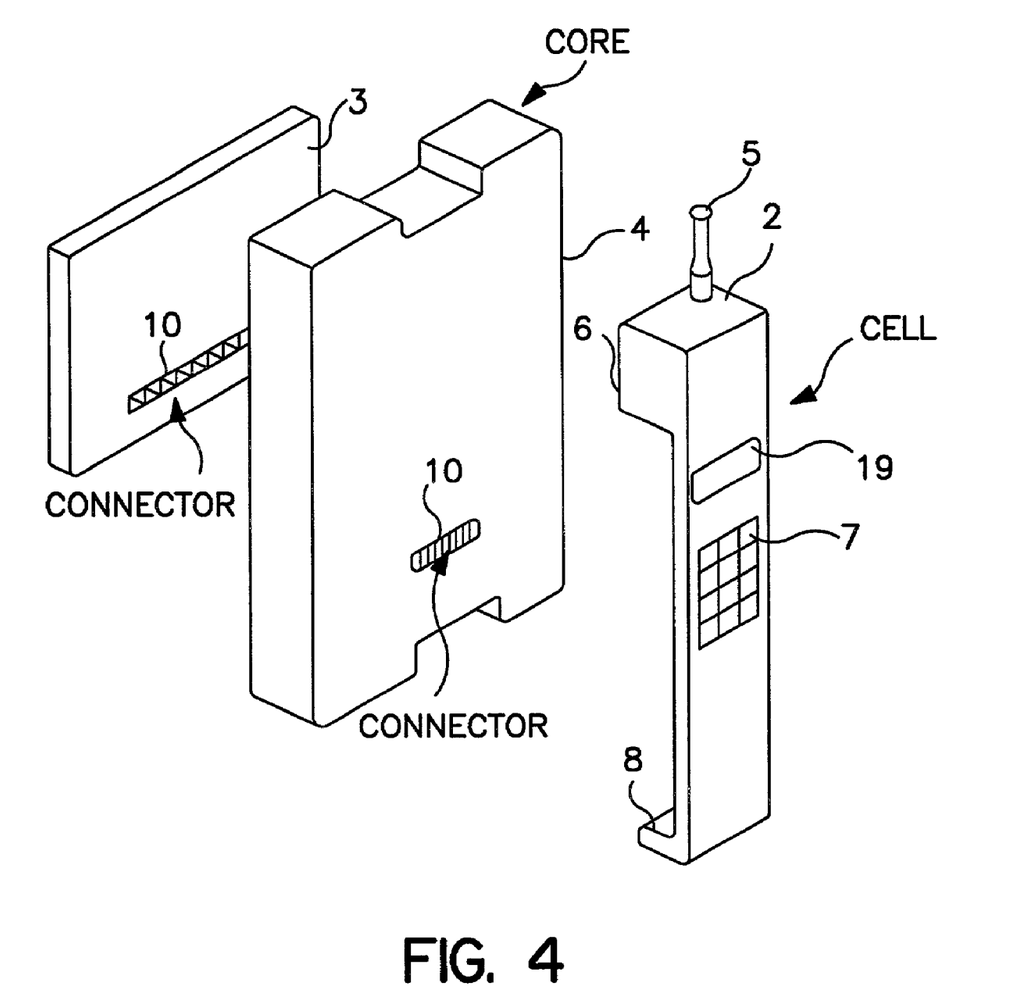
FIG. 4 is a back perspective view of the personal communicator of FIG. 3 when all of the modules are detached from each other.
Figure 5:
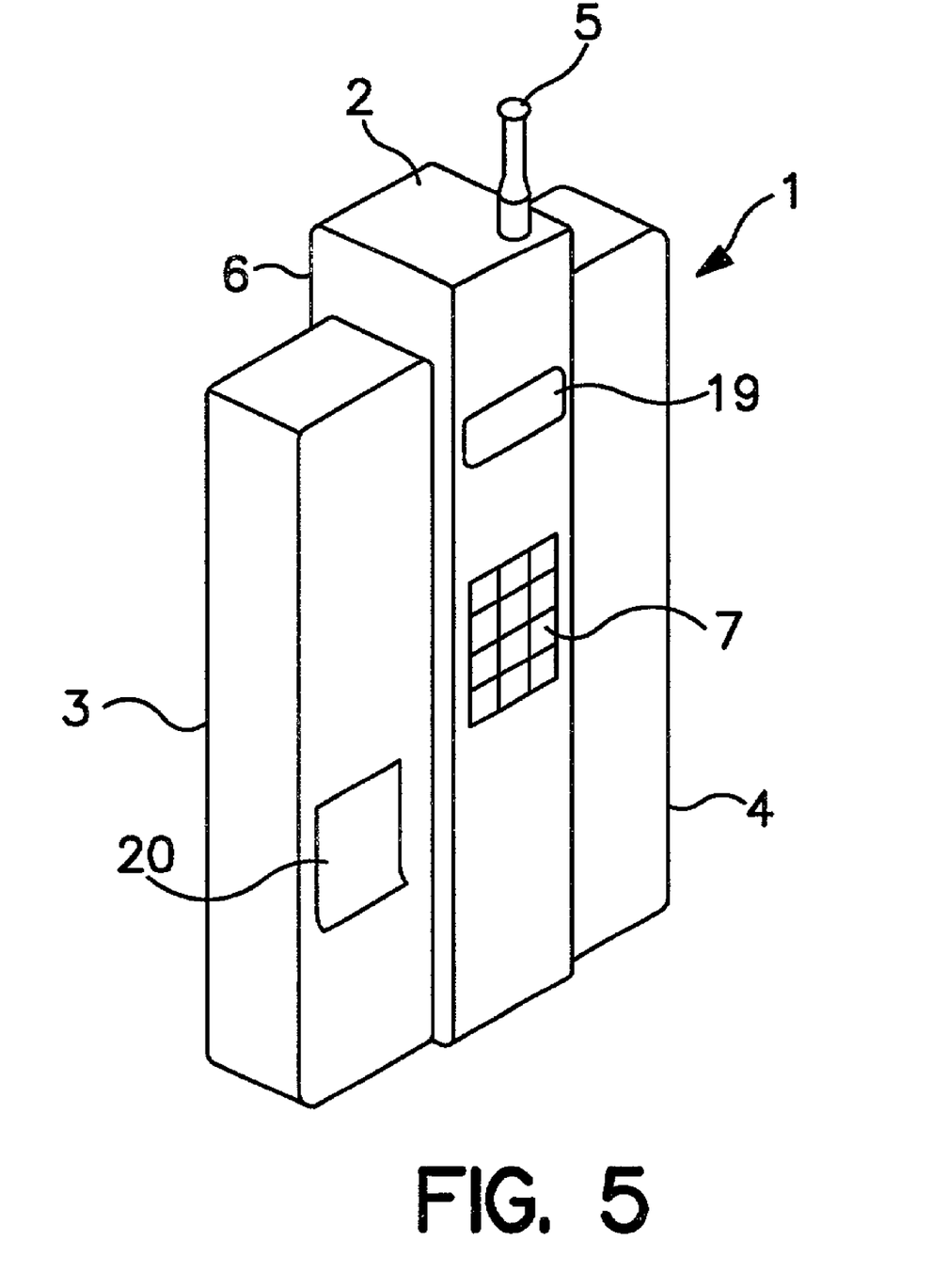
FIG. 5 is a back perspective view of an embodiment of this invention with all of the modules connected and in place.
Figure 6:
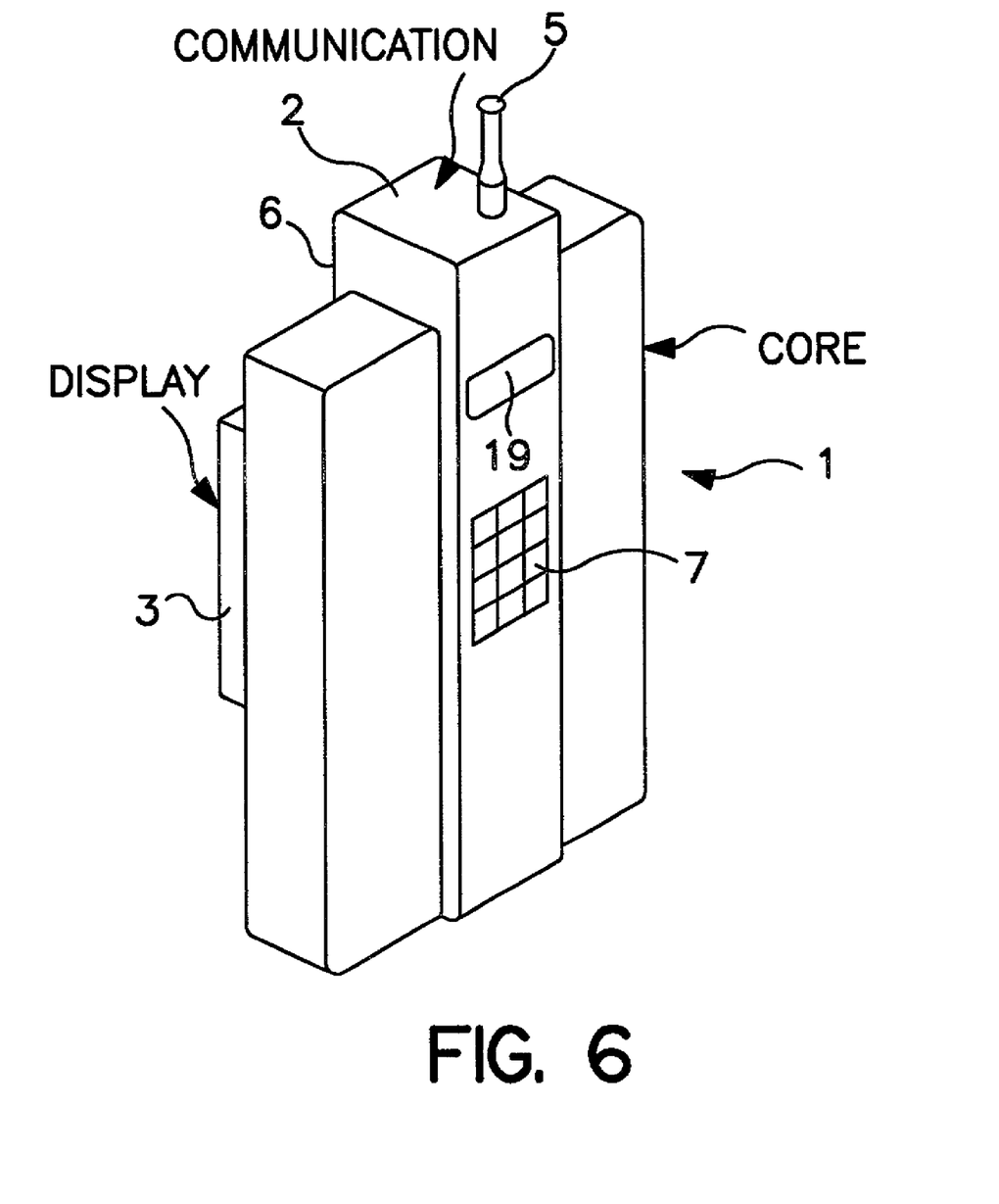
FIG. 6 is a back perspective view of an embodiment of this invention with all of the modules connected and showing the position of the display modules in place.

In FIG. 4 the back portions of each module is shown with electrical connectors 10 which are used to put each module in electrical and physical connection with each other. In this embodiment the computer and pager are in module 4 and can be attached to a larger FPD as shown in FIGS. 7A and 7B for better resolution and for shared viewing. FIG. 4 shows the same embodiment as in FIG. 3, except that the modules 2, 3, and 4 are disconnected from each other. In all embodiments of FIG. 1 through FIG. 4, any suitable battery may be used as in a conventional wearable computer of U.S. Pat. No. 5,844,824 or telephone mentioned above in the Background of the Invention. In FIGS. 5 and 6 the unit 1 is shown in a back view when each module 2, 3 and 4 are connected. In this embodiment the keypad 7 is on the outside of communications module 2 so that the pad 7 can be used when the modules are assembled. Phone display 19 is also positioned in the back so it also may be used when assembled.

As noted earlier, the core module 4 can be removed from personal communicator 1 or entire unit 1 may be used in any other suitable enclosure (as disclosed in commonly owned applications Ser. Nos. 08/911,642 and 09/009,206) or can be used with a larger FPD like the folio 11 shown in FIGS. 7A and 7B. In FIGS. 7A and 7B an inverted V-shaped folio 11 is illustrated having a battery stick 12, a hinged cover 13 and a large display screen 14. The opened folio 11 of FIG. 7B can stand firmly on a flat surface and with the computer module 4 (or unit 1) as shown docked in docking opening 21 into FIG. 7A can give the user a functionality that constitutes a laptop functionality. The battery stick 12 fits into the hinged portion or housing 15 and provides the power required similar to the laptop requirements. The housing 15 contains a dock port or opening 16 in which unit 1 or core computer module 4 will fit when used with folio 11. FIG. 7A shows unit 1 (or personal communicator 1) docked ready for use and display via monitor or display screen 14. Also provided in folio 11 is a number of peripheral ports 17 for connection to audio jacks, ear phones, head mounted displays, or any other suitable peripherals.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention, for example as earlier noted the modules while preferred to be removable or detachable can be all attached as a permanent unit Also, the preferred parameters include at least 80 MB; however, if desirable, a lower MB may be used.

What is claimed is:

1. A personal communicator comprising in combination three modules, said modules have means that allow each to be removable and have means to keep each module connected to each other, said modules being a communications module, a display module and a core module, said communications module having an ear piece with means to cooperate and function with a microphone located in said personal communicator in or outside said communications module to act thereby as a mobile telephone, said personal communicator having activation means selected from the group consisting of touch activation, audio activation and mixtures thereof, each of said detachable modules when detached having means to function when connected to or with other enclosures or attachments, said core module having a single completely closed housing having internally therein components of a fully functional conventional general purpose computer, including internal non-volatile mass storage means, said core module not functional as a computer when standing alone or when detached from said personal communicator, said core module only functional as a computer when in electrical contact with an enclosure, said core module having means to be used with totally new and different type structures other than said personal communicator, and wherein all of said components in said core housing are completely enclosed therein and may not be removed, said core module devoid of any power means, said power means only supplied by said personal communicator or other enclosures.

2. The personal communicator of claim 1 wherein said core computer module has at least the following:

At least a 16 bit microprocessor with a memory of at least 32 Mbytes of RAM: and A mass storage memory of at least 80 Mbytes.

3. The core computer module of claim 1 with all of the components of a general purpose computer and having when detached, activation means selected from the group consisting of audio activation means, eye-tracking activation means, electroencephalography activation means, head and arm-tracking means, touch activation means and mixtures thereof.

4. The personal communicator of claim 1 wherein said core computer module comprises a pager and e-mail means.

5. The personal communicator of claim 1 wherein said core computer module comprises means selected from the group consisting of a pager, facsimile means, personal organizer or mixtures thereof.

6. The personal communicator of claim 1 having means to be docked mechanically or through wireless means into a monitor having a display substantially larger and with greater resolution than the display in said display module.

7. The core computer module of claim 1 having means to be docked into a monitor having a display substantially larger and with greater resolution than the display in said display module.

8. The personal communicator of claim 1 having means for attachment to the body of the user.

9. The personal communicator of claim 1 when assembled with each of said detachable modules connected having an antenna mouth piece and an ear piece in said communications module and a means to connect to said core computer module in an outside positioned keypad on the outside surface of said communication module, thereby having means to function as a mobile phone when all modules are connected.

10. The personal communicator of claim 1 having incorporated therein a member selected from the group consisting of a television means, a radio means, a still camera means, a video camera means and mixtures thereof.

11. The personal communicator of claim 1 having at least two display means, a first in said display module and a second in said communications module or said core module.

12. The personal communicator of claim 1 where all of the said modules are removably connected to each other.

13. The personal communicator of claim 1 where the communications and core computer modules are permanently connected to each other.

14. A personal communicator comprising:

a communications module enabling the personal communicator to function as a mobile telephone;

a core module detachably coupled to the communication module; and a display module detachably coupled to the core module, wherein the core module lacks an independent power supply and is not functional as a computer when decoupled from the communications module.

* * * * *